3,350,472
SORBING CONJUGATED DIOLEFINS ON AMMONIA-TREATED FAUJASITE
Richard Joseph DeFeo, Baton Rouge, La., assignor to Esso Research and Engineering Company, a corporation of Delaware
No Drawing. Filed Dec. 1, 1964, Ser. No. 415,161
11 Claims. (Cl. 260—677)

ABSTRACT OF THE DISCLOSURE

The present invention is directed to an improved process for selective purification of alpha (terminal) monoolefins, while inhibiting double bond isomerization thereof, wherein alpha monoolefins are separated from hydrocarbon feedstocks containing predominantly a mixture of alphamonoolefins and polyolefins, especially conjugated diolefins, and in some cases also containing aromatics. The process steps include contacting said olefin mixture containing feedstock with an ammonia pretreated and calcined synthetic faujasite sorbent having a silica:alumina mole ratio of at least 3:1, said polyolefins (and aromatics, if present) being sorbed on said sorbent whereas said alpha monoolefins pass through essentially unisomerized, and are recovered in a substantially purified form.

---

It is already known that certain porous substances, such as silica gel, activated char and zeolites have certain selective adsorption characteristics useful in resolving a hydrocarbon mixture into its components. Thus silica gel is used to remove aromatic hydrocarbons from non-aromatic hydrocarbons, and activated charcoals are used in separating olefins from mixtures with paraffins. Similarly "Type A" molecular sieves, which are certain crystalline zeolites having a $SiO_2:Al_2O_3$ mole ratio of about 2:1 and pore openings of about 4 to 5 Angstroms, have the capacity of retaining and thus separating n-hydrocarbons from branched chain and cyclic hydrocarbons.

Another type of zeolitic molecular sieve, frequently referred to as "Type X" has been used successfully to selectively remove aromatics from hydrocarbon mixtures containing them. The "Type X" sieves differ from the "Type A" sieves in selectivity (nature of hydrocarbon selectively removed) and X-ray diffraction pattern. "Type X" sieves also are characterized by a silica to alumina mole ratio of <3:1, e.g., 2.5:1.

There are many other highly desirable separations, however, that these porous materials, "Type A" and "Type X" sieves are not capable of making effectively. For example, it is a desideratum to separate linear alpha monoolefins from mixtures of the same with polyolefins, especially conjugated diolefins, aromatics, and other hydrogen deficient hydrocarbons. "Type A" sieves are not capable of conducting such a separation effectively because even though they allow some surface adsorption of aromatics along with their primary selectivity for n-paraffin removal, "Type A" sieves do not remove aromatics selectively, nor do they effectively remove conjugated diolefins. "Type X" sieves remove aromatics selectively, but demonstrate very poor ability to selectively remove polyolefins, especially conjugated diolefins, from linear aliphatic alpha monoolefins.

Recently a process has been developed for selectively removing both aromatics and polyolefins, especially the difficult to remove conjugated diolefins, from hydrocarbon mixtures containing the same with alpha monoolefins. This newly developed process for purifying alpha monoolefins employs a crystalline faujasite sorbent having a $SiO_2$ to $Al_2O_3$ mole ratio of at least 3:1 and effective pore openings of 6 to 15 angstrom units. These sorbents have excellent capacity to remove both aromatics and polyolefins, especially the difficult to remove conjugated diolefins, selectively. Consequently, these faujasite sorbents having a $SiO_2:Al_2O_3$ mole ratio of at least 3:1 are superior to both "Type A" and "Type X" sieves in selectively purifying alpha monoolefins.

While the above described recently developed faujasite alpha monoolefin purification process represents a significant step forward in the art, the use thereof involves a troublesome drawback in that at the elevated temperatures employed to purify the alpha monoolefins, double bond isomerization thereof is found to occur when using sorbents having a $SiO_2:Al_2O_3$ mole ratio of at least 3:1 and especially those which contain a significant concentration of sodium ions. The present invention overcomes this drawback by allowing purification of the alpha monoolefins using said faujasite sorbents having an $SiO_2:Al_2O_3$ mole ratio of at least 3:1 while inhibiting double bond isomerization thereof.

The improved process of this invention is conducted by contacting the natural or synthetic faujasite sorbent with anhydrous ammonia at temperatures ranging from about 100 to 800° F. for a sufficient time period to saturate said faujasite sorbent therewith; heating said ammonia-impregnated sorbent at temperatures higher than those employed to effect ammonia impregnation and ranging from 700 to 1100° F. to calcine said sorbent thereby removing excess ammonia and deactivating the sorbent sites which enhance isomerization of the external double bond; then contacting the olefin mixture containing hydrocarbon feedstock with the said ammonia-treated and calcined faujasite sorbent at temperatures ranging from 50 to 800° F. and recovering essentially unisomerized alpha monoolefins therefrom, said contact and said recovery steps being conducted in the absence of extraneous ammonia.

While the exact mechanism involved in securing the advantageous effect of purification while inhibiting double bond isomerization is not clearly known, the pretreatment with ammonia followed by calcination according to the present invention irreversibly deactivates those sites on the synthetic faujasite sorbent which assist or catalyze isomerization, but without appreciably affecting the sorptive capacity of the sorbent employed in the purification process. A significant and highly advantageous feature of the present invention is that the isomerization tendency of the faujasite sorbents is irreversibly inhibited. This is borne out by the fact that the tendency to cause isomerization does not recur even though repeated sorption-desorption cycles are conducted using the ammonia-treated, calcined faujasite sorbents.

The contacting and recovery steps should be conducted in the absence of extraneous ammonia (i.e., no additional ammonia being added subsequent to the pretreatment of the sorbent), in order to avoid chemical reaction between the alpha monoolefins and the ammonia. Such reactions would destroy the chemical identity of the purified alpha monoolefins, and are therefore to be avoided.

Any natural or synthetic crystalline faujasite sorbents can be employed which produce selective purification of alpha monoolefins. These crsytalline faujasite sorbents are alkali and alkaline earth alumino silicates having effective pore openings (pore diameters) of about 6 to 15 angstrom units. Said faujasites should have a silica-to-alumina mole ratio of at least 3:1, as such faujasites are not only readily regenerable by the use of steam, but also possess superior capacity for diolefin removal, especially conjugated diolefins, as compared to sorbents having $SiO_2:Al_2O_3$ mole ratios <3:1, e.g., of 2.5:1. More preferably the mole ratio of $SiO_2:Al_2O_3$ ranges from 3 to 7:1, and most preferably from 4 to 6:1. In accordance with this invention, the use of synthetic crystalline faujasites is preferred as the naturally occurring faujasites are in sparse supply and hence far more expensive than the synthetic faujasites. In general, these crystalline alumino silicate faujasites contain a substantial portion of an alkali metal or alkaline earth metal oxide, e.g., sodium oxide, potassium oxide, calcium oxide, etc. In place of or in addition to the sodium and potassium oxides, the faujasite sorbents employed herein can also contain other alkali metal or alkaline earth metal oxides, e.g., rubidium oxide, cesium oxide, etc.

In general, the chemical composition of the crystalline alumino silicate faujasite sorbents will follow the below expressed chemical formula (wherein the components of the faujasite are expressed in terms of moles):

$$M_{2/n}O \cdot Al_2O_3 x SiO_2$$

wherein M is an alkali or alkaline earth metal selected from a group consisting of sodium, potassium, lithium, rubidium, strontium, magnesium, calcium, cesium, and barium; $x$ has a value of at least three, preferably ranging from 3 to 7; and $n$ is the valence of the metal cation.

The above chemical formula indicates the actual chemical composition of the prepared, active crystalline faujasite sorbents suitable for use in accordance with the present invention, and not the solution(s) from which said sorbents are prepared.

Natural and synthetic faujasite sorbents of the type whose use is contemplated herein are known, and the specific chemical nature of the faujasite sorbent can be varied widely within the purview of this invention. The following faujasite sorbents having the below indicated analysis (in terms of mole percent) can be cited as exemplary of those which can be used according to this invention:

| Component: | Mole percent |
|---|---|
| $Na_2O$, $K_2O$, $CaO$, etc. | 8.1 to 6.5 |
| $SiO_2$ | 23.0 to 41.1 |
| $Al_2O_3$ | 7.7 to 5.9 |
| $H_2O$ | 61.2 to 46.5 |
| $SiO_2:Al_2O_3$ | [1] 3 to 7:1 |

[1] Mole ratio.

The processes for synthetically producing crystalline zeolites are well known in the art. Typical processes involve crystallization from reaction mixtures containing $Al_2O_3$ as sodium aluminate, alumina sol and the like; $SiO_2$ as sodium silicate and/or silica gel and/or silica sol; and $Na_2O$ as sodium hydroxide. Careful control is kept over the soda ($Na_2O$) concentration of the mixture, as well as the proportions of silica-to-alumina and soda-to-silica, the crystallization period, etc., in order to obtain the desired product. A conventional scheme for preparing crystalline alumino-silicate zeolites of the faujasite type would be as follows:

Colloidal silica, such as commercial Ludox (supplied by E. I. du Pont de Nemours Co., Inc.) is mixed with a solution of sodium hydroxide and sodium aluminate at ambient temperatures to produce a reaction mixture having the following molar ratios of reactants:

| Reactants: | Mol ratio |
|---|---|
| $Na_2O/SiO_2$ | 0.28 to 0.45 |
| $SiO_2/Al_2O_3$ | 7 to 30 |
| $H_2O/Na_2O$ | 20 to 60 |
| $SiO_2/Al_2O_3$ in Product | [1] 3 to 7 |

[1] Preferably 4–6.

The reaction mixture may then be allowed to digest at ambient temperatures for up to 40 hours or more in order to aid crystallization, after which period it is heated at 180 to 250° F., e.g., 200 to 220° F., for a sufficient time to crystallize the product, e.g., 24 to 200 hours or more. The crystalline, metallo alumino-silicate is separated from the aqueous mother liquor by decantation or filtration and washed to recover a crystalline product.

A typical procedure for preparing synthetic faujasite sorbents suitable for use in accordance with this invention is given hereinbelow.

A solution of (1) commercial sodium aluminate containing 38 wt. percent $Na_2O$, 38 wt. percent $Al_2O_3$, and 24 wt. percent $H_2O$, and (2) sodium hydroxide containing 75 wt. percent $Na_2O$ in water was added to (3) a commercially available aqueous sol in colloidal silica containing about 30 wt. percent $SiO_2$ and a weight ratio of soda-to-silica equal to 1:285 ("Ludox" solution supplied by E. I. du Pont de Nemours & Co., Inc.), under rapid stirring conditions at ambient temperature, e.g., about 75° F., to form an essentially homogeneous mixture. The homogeneous reaction mixture was aged for up to about 10 hours at ambient temperature and then heated to and held at a temperature of about 200 to 215° F., e.g., 210° F., until the product sufficiently crystallized. The crystallization period was determined by the length of time necessary to produce maximum crystallinity of product, as measured by periodically withdrawing a sample and analyzing for crystallinity by X-ray diffraction techniques. The crystallization step was terminated by quenching the reaction mixture with large volumes of cold water. The crystalline product was then separated from the mother liquor by filtration, thoroughly water-washed until the wash water had a pH of about 9.3, and finally dried at a temperature of about 265° F.

The silica-to-alumina mole ratio of the product sorbent will depend not only upon the proportion of ingredients used, but also upon the preparation procedure employed. Therefore, using the above described typical preparation procedure, a sodium form synthetic faujasite sorbent having a silica-to-alumina mole ratio of approximately 4.2:1 was prepared using the following ingredients: 6870 grams of 97% NaOH, 1513 grams of sodium aluminate, 37.6 kg. of silica sol, and 27 liters of water. This material analyzed, after drying, 14.0% $Na_2O$, 58.6% $SiO_2$, and 23.4% $Al_2O_3$. On a mole basis, this analysis corresponds to $0.98Na_2O:1.00Al_2O_3:4.2SiO_2$.

To produce a silica-to-alumina ratio of about 5.3, the above amounts of ingredients were adjusted as follows: 6000 grams of NaOH, 1700 grams of sodium aluminate, 38.6 kg. of silica sol, and 21.5 liters of water. This faujasite analyzed, after drying 13.7% $Na_2O$, 66.8% $SiO_2$, and 21.3% $Al_2O_3$. On a mole basis this corresponds to $1.07Na_2O:1.00Al_2O_3:5.5SiO_2$.

Additional information of preparation of synthetic faujasite sorbents having silica-to-alumina mole ratios of 3 to 7:1 is contained in S.N. 354,981, filed on March 26, 1964, in the name of W. J. Mattox, the disclosure of which is incorporated herein by reference.

The ammonia employed for treatment of the faujasite sorbent is anhydrous and is a gas at the treatment temperatures used. The treatment temperatures employed for the contact of the anhydrous ammonia with the natural or synthetic faujasite sorbent usually range from about 100 to 800° F., and preferably range from about 250 to about 750° F. The ammonia is contacted with the sorbent for sufficient time to saturate the sorbent bed with ammonia. A satisfactory way of conducting this ammonia contacting treatment is by passing ammonia from the bottom of the sorbent bed upwards. When the faujasite sorbent is saturated with ammonia, ammonia will pass through the bed upward and will be present in the off-gas at the top of the sorbent bed.

Any convenient ammonia flow rates can be used to accomplish saturation of the faujasite sorbent with ammonia. Generally, the ammonia flow rate ranges from 0.05 to 1.0 weight parts of ammonia per weight part of faujasite sorbent per hour. Usually, however, it will be desirable to employ an ammonia flow rate of 0.1 to 0.6 w./w./hr. The preferred ammonia flow rates range from 0.2 to 0.5 w./w./hr.

In accordance with the present invention, the ammonia-treated sorbent is calcined employing a higher temperature than used for ammonia impregnation and usually ranging from 700 to 1100° F., and preferably range from 900 to 1050° F. Other excess ammonia removal procedures can be used in conjunction with heating. For example, an inert gas, which is inert to the sorbent both chemically and physically, i.e., not adsorbed thereon, e.g., nitrogen, argon, xenon, etc., can be passed through the ammonia impregnated faujasite sorbent bed at the above calcination temperatures to accelerate or otherwise aid in removing excess ammonia therefrom.

After removal of excess ammonia from the faujasite sorbent by calcination (heating) as described above, the sorbent contains from about 0.1 to 0.8 wt. percent of ammonia based upon the total of said sorbent plus ammonia remaining after calcination. This ammonia is very probably chemically combined with those sites on the faujasite sorbents which cause or enhance the occurrence of isomerization of the double bond in the alpha monoolefins. Usually, the ammonia content of the faujasite sorbent after calcination ranges from 0.2 to 0.8 wt. percent, and preferably from about 0.3 to about 0.6 wt. percent. Of course, the exact concentration of combined ammonia on the faujasite sorbent will vary somewhat within the above ranges depending upon the specific chemical nature of the faujasite sorbent, which in turn determines the concentration of active isomerization sites thereon.

Subsequent to the calcination the hydrocarbon feedstock containing predominantly a mixture of monoolefins (mostly alpha monoolefins), diolefins (including conjugated diolefins) and varying minor amounts of aromatics is contacted with the sorbent to accomplish purification of said monoolefins. These hydrocarbon mixtures usually contain in excess of 60 wt. percent of the alpha monoolefin-diolefin mixtures. The present invention works especially well to purify alpha monoolefins from hydrocarbon streams containing a mixture of diolefins and alpha monoolefins and obtained by the cracking of higher molecular weight paraffin wax feeds. These waxed-cracked feeds usually have compositions within the below described ranges (to total 100% by weight):

| Usual components: | Usual weight concentrations (wt. percent of feed) |
|---|---|
| Linear Monoolefins | [1] 72–78 |
| Cyclic Monoolefins | 6–12 |
| Conjugated Diolefins | 1–4 |
| Non-conjugated Diolefins | 9–12 |
| Aromatics | 2–5 |
| Paraffins | (0–1.0) |

[1] 90 wt. percent of which are alpha.

The olefin purification process can be conducted at temperatures ranging from about 50 to 800° F., usually ranging from about 200 to 600° F., and preferably ranging from about 250 to 550° F. The hydrocarbon feedstocks are contacted with the ammonia pretreated, calcined synthetic faujasite sorbents at feed flow rates which can range from about 0.1 to 5 weight parts of hydrocarbon feed per weight part of faujasite sorbent per hour. Usually the feed flow rates range from about 0.2 to 2 w./w./hr., and preferably from about 0.2 to 1 w./w./hr.

The present invention will be described in greater detail by the following examples.

EXAMPLE I

Tests made with crude $C_8$ petrolatum olefin feed and faujasites of different silica-to-alumina mol ratios have shown very pronounced differences in sorptive capacity and in olefin isomerization activity. The results of these tests are summarized below. The contacting operation, wherein the $C_8$ petrolatum olefin feed was contacted with the synthetic faujasites, was conducted at a temperature of 300° F. and at the below indicated respective feed flow rates for from 1 to 1.5 hours.

EFFECTS OF $SiO_2 : Al_2O_3$ MOLE RATIO ON ADSORPTIVE CAPACITY OF FAUJASITE SORBENTS FOR $C_8$ OLEFIN CONTAMINANTS AND ISOMERIZATION OF PURIFIED PRODUCT (TYPE I MONO ALPHA OLEFINS)

| | Feed | Faujasite $SiO_2 : Al_2O_3$ Ratio | | |
|---|---|---|---|---|
| | | 2.5 : 1 | 4.2 : 1 | 5.3 : 1 |
| Feed Rate (w./w./hr.) | | 0.34 | 0.39 | 0.33 |
| Octene Effluent, w./w. | | 0–0.23 | 0–0.45 | 0–0.27 |
| Monoolefin Analysis at— | | | | |
| Percent Type I | 93 | 90 | 68 | 84 |
| Percent Type II | 3 | 4 | 25 | 13 |
| Percent Type III | 3 | 1 | 2 | 0 |
| Percent Type IV | 1 | 5 | 5 | 3 |
| Percent Conjugated Diolefins in Product: | | | | |
| First 0.05 w./w. of Product | 2.5 | 0.02 | <0.04 | <0.04 |
| Second 0.05 w./w. of Product | | 0.15 | <0.04 | <0.04 |
| Next 013 w./w. of Product | | 2.2 | <0.04 | <0.04 |
| Percent aromatics (at 0–0.3 w./w.) | 3.2 | 0 | 0 | 0 |

Although the low (2.5:1 mole ratio $SiO_2 : Al_2O_3$) ratio faujasite showed very little isomerization activity and removed all aromatics, the capacity of this faujasite sorbent for removing conjugated diolefins was quite limited. Correlated experiments conducted using the faujasite sorbent having a silica-to-alumina ratio to 2.5:1 indicated that no more than about 0.05 to 0.1 w./w. of conjugated diolefin-free effluent could be produced using this faujasite under such contacting conditions. The removal of conjugated diolefins is important, however, as these conjugated diolefins when present in the product stream have a tendency to polymerize and undergo condensation reactions thus reducing the economic value of the product stream of mono alpha olefins when it contains even small amounts of these conjugated diolefins, e.g. 0.5+ wt. percent.

The data for the faujasite sorbents having $SiO_2 : Al_2O_3$ mole ratios of at least 3:1 in conjunction with additional related experiments indicate that the effluents produced with these faujasites contained not more than trace amounts of these objectionable conjugated diolefins when using feed flow rates of up to about 0.5 w./w./hr. or even higher.

Thus, it would be highly desirable to be able to use the higher silica-alumina mole ratio containing faujasite sorbents were it not for their tendency to cause isomerization of the purified mono alpha olefin (Type I) product. This isomerization drawback is effectively inhibited by treatment in accordance with the present invention as indicated in the examples below, thus permitting the use of the faujasite sorbents having silica-to-alumina mole ratios of at least 3:1 to effect the desired purification and obtain excellent diolefin removal without appreciable olefin isomerization.

EXAMPLE II

| Components of $C_8$ Olefin Fraction: | Concentration (wt. percent) |
|---|---|
| Linear Monoolefins | 75.5 |
| Cyclic Monoolefins | 7.3 |
| Conjugated Diolefins | 2.5 |
| Non-conjugated Diolefins | 11.0 |
| Aromatics | 3.2 |
| Paraffins | 0.5 |

The above $C_8$ olefin containing hydrocarbon feedstock containing approximately 96 wt. percent of a mixture of diolefins and monoolefins (most of which were alpha monoolefins) and obtained by the wax cracking of higher molecular weight olefins was purified in the following manner. A synthetic faujasite sorbent having the chemical formula:

$$K_2O : Al_2O_3 \cdot 4.2SiO_2$$

was contacted with ammonia at a temperature of 700° F. using an ammonia feed flow rate of 0.5 w./w./hr. for a period of one hour, followed by calcination to remove excess ammonia at a temperature of 1000° F. for 16 hours.

A companion test was conducted by heating the same synthetic faujasite sorbent in air at 1000° F. for 16 hours (no ammonia treatment) before use.

Previous chemical analysis of the monoolefin content (C_8 mono alpha olefins) of the above hydrocarbon feed with regard to olefin type revealed that of the linear monoolefins in the hydrocarbon feedstock 93 wt. percent were linear alpha monoolefins (Type I olefins) and 3% were Type II monoolefins (with the remaining 4 wt. percent being Type III and Type IV).

Companion olefin purification procedures were conducted using identical synthetic potassium faujasites of the above specified chemical formula by passing the above hydrocarbon feed over the ammonia pretreated and calcined sorbent and the sorbent which was calcined but without ammonia pretreatment, viz, heated at 1000° F. in air. The purification processes were conducted by passing the hydrocarbon feed in contact with the sorbent at 500° F. using 0.2 w./w./hr. feed flow rate.

The olefin purification process conducted on the non-ammonia pretreated faujasite sorbent resulted in a purified product containing linear olefins of which 80 wt. percent were Type I olefins (alpha monoolefins) and 10 wt. percent were Type II olefins (internal olefins). The olefin purification process conducted using the ammonia treated faujasite sorbent resulted in a purified linear olefin product of which 90 wt. percent of the linear monoolefins were Type I (alpha monoolefins) and only 3 wt. percent were Type II monoolefins (internal olefins). Hence, it is clearly apparent that the ammonia pretreatment of the faujasite sorbent followed by calcination in accordance with the present invention significantly inhibits isomerization of the double bond in these alpha monoolefin components of the hydrocarbon feed. Both sorbents remove essentially all conjugated diolefins and aromatics.

EXAMPLE III

The procedure of Example II was repeated except that a sodium form synthetic faujasite sorbent having the same $SiO_2:Al_2O_3$ mole ratio as in Example I, but containing 13.7 wt. percent $Na_2O$ was first exchanged with potassium chloride to the 25 percent exchange level, i.e., 5.1 wt. percent $K_2O$ and 10.1 wt. percent $Na_2O$, and was pilled and calcined. This synthetic faujasite was then used in an adsorption test conducted at 500° F. using a similar $C_8$ olefin feed as set forth in Example II, above. One test was conducted using an ammonia pretreated and calcined faujasite sorbent (contacted with ammonia at a temperature of 500° F. using an ammonia feed flow rate of 0.5 w./w./hr. to attain saturation of the sorbent with ammonia followed by calcination at 1000° F. for approximately 16 hours to remove excess ammonia therefrom). The other test was conducted using the same synthetic faujasite sorbent but without ammonia pretreatment. In both cases the olefin purification procedure was conducted at 500° F. using a hydrocarbon feed flow rate of 0.3 w./w./hr. The latter sorbent was calcined (heated in air) at 1000° F. for 16 hours.

The $C_8$ olefin containing hydrocarbon feedstock was analyzed, before purification, and the analysis revealed that 84 wt. percent of the linear monoolefins were Type I olefins (alpha) and 3 wt. percent were Type II (internal monoolefins).

The test results indicate a purified linear monoolefin product stream of which only 9 wt. percent of the linear monoolefins were Type I (alpha monoolefins) for the sorbent which was calcined alone (no ammonia pretreatment), with 68 wt. percent of the linear monoolefins being Type II linear monoolefins. In dramatic contrast therewith, the same synthetic faujasite sorbent, only having the ammonia pretreatment followed by calcination resulted in a purified olefin stream with 85 wt. percent of the linear monoolefins being Type I (mono alpha olefins), and only 7 wt. percent of the linear monoolefins being Type II monoolefins. Both sorbents removed essentially all conjugated diolefins and aromatics.

The high extent of isomerization present with the use of the sodium containing faujasite sorbent having no ammonia pretreatment is not surprising due to the fact that the more sodium present in a faujasite sorbent, the more active the sorbent is toward double bond isomerization. However, the extent of avoidance of double bond isomerization of alpha monoolefins obtained with the same sorbent, only pretreated with ammonia and calcined in accordance with this invention, is quite surprising.

EXAMPLE V

A sample of a synthetic faujasite sorbent having a silica-to-alumina mole ratio of 5.3:1 and an initial sodium concentration of 13.7 wt. percent $Na_2O$ was exchanged at the 25% level using potassium chloride to produce a synthetic faujasite having a 5.1 wt percent $K_2O$ and 10.1 wt. percent $Na_2O$.

Another sample of the same material was treated in accordance with this invention with anhydrous ammonia at a temperature of 300° F. for one hour using an ammonia feed flow rate of 0.5 w./w./hr. followed by calcination at 1000° F. for 16 hours to remove excess ammonia therefrom. Both samples were analyzed for acidic sites. The following data show the complete deactivation of faujasite acidity (which is believed to catalytically cause isomerization of the double bonds in the alpha monoolefins) by the ammonia treatment.

|  | Surface acidity (milliequivalents/grams) |
|---|---|
| Fresh sorbent | 0.23 |
| Ammonia-treated sorbent | 0.00 |

The ammonia treated sorbent contained 0.004 gram of ammonia per gram of sorbent, viz, approximately 0.4 wt. percent ammonia being present in the isomerization deactivated faujasite.

EXAMPLE V

The purification of a $C_7$ to $C_9$ linear wax-cracked olefin fraction by sorption on a 20% potassium exchanged faujasite exchanged as in Example IV was conducted at a temperature of 300° F. This sorbent had a $SiO_2:Al_2O_3$ mole ratio of 5.3:1. In one experiment a fresh sorbent bed was calcined at 1000° F. in air (no ammonia treatment). A sorption cycle was carried out at 300° F. using a feed flow rate of 0.2 w./w./hr. (hereinafter designated cycle 1). This was followed by desorption with steam for one hour (0.5 wt. percent parts of steam per wt. part of sorbent per hour) at 500° F. followed by drying with nitrogen for one hour at 500° F. A second sorption cycle (designated cycle 2) was then put over the sorbent also at 300° F. and the same hydrocarbon feed flow rate as in cycle 1 and the same desorption procedure was repeated.

A second companion sorbent bed was treated with ammonia at 300° F. for one hour prior to the calcination, and the same sorption-desorption sequence was repeated over two cycles. This ammonia treatment and calcination effectively deactivated isomerization sites. The results are tabulated below. Of the linear monoolefins components in the untreated hydrocarbon feed, 90 wt. percent were Type I (alpha) monoolefins prior to purification. This feed was similar to that of Example II and contained aromatic and conjugated diolefin contaminants.

| Type I Olefin Content of Linear Monoolefin Component in Purified Product After Cycle | Sorbent I (Calcined), wt. percent | Sorbent II (Ammonia Treated and Calcined), wt. percent |
|---|---|---|
| I | 84.1 | 90.4 |
| II | 30.5 | 92.4 |

Both sorbents removed essentially all conjugated diolefin and aromatics.

These data show the advantages of the ammonia treatment when conducted in accordance with this invention over repeated sorption-desorption cycles for olefin purification of alpha monoolefins. Moreover, the data also show that a steam desorption technique can be employed advantageously without increasing the isomerization of the purified alpha monoolefins during repeated cycles of the purification process.

This example further indicates that the isomerization site deactivation accomplished by the ammonia treatment is essentially irreversible, viz., once the isomerization sites are deactivated, the sorbent can be repeatedly used without requiring additional ammonia treatment to produce high purity mono alpha olefins.

Moreover the slight increase in alpha olefin content of the purified product stream occurring with the use of the ammonia pretreated and calcined faujasite sorbents suggests that some of the internal olefins may be undergoing outward double bond rearrangement to alpha olefins. A similar behavior was noted in Example III.

What is claimed is:

1. A process for separating alpha monoolefins from conjugated diolefins while inhibiting double bond isomerization of said alpha monoolefins which comprises contacting a faujasite sorbent having a silica-to-alumina mole ratio of at least 3:1 with anhydrous ammonia at temperatures ranging from about 100 to about 800° F. for a sufficient time period to saturate said faujasite sorbent therewith, calcining said ammonia-treated sorbent at a higher temperature than used for ammonia treatment and ranging from about 700 to 1100° F., contacting a hydrocarbon feedstock containing a mixture of alpha monoolefins and conjugated diolefins with said ammonia-treated calcined faujasite sorbent at temperatures ranging from about 50 to about 800° F. thereby sorbing said conjugated diolefins on said sorbent, and recovering essentially unisomerized alpha monoolefins, said contact and said recovery steps being conducted in the absence of extraneous ammonia.

2. A process as in claim 1 which includes recovering said conjugated diolefins by desorption from said faujasite sorbent.

3. A process as in claim 2 wherein said desorption is accomplished by passing steam in contact with said faujasite sorbent at elevated temperatures.

4. A process as in claim 1 wherein said ammonia-treated, calcined faujasite sorbent contains from about 0.1 to 0.8 wt. percent ammonia following calcination.

5. A process in accordance with claim 1 wherein said faujasite sorbent is an alkali metal oxide containing faujasite sorbent containing at least one alkali metal oxide selected from the group consisting of sodium oxide and potassium oxide.

6. A process as in claim 1 wherein the olefinic mixture containing hydrocarbon feedstock is contacted with the ammonia treated synthetic faujasite sorbent at temperatures ranging from about 200 to about 600° F.

7. A process as in claim 1 wherein said faujasite sorbent has effective pore openings ranging from about 6 to 15 angstrom units.

8. The process of claim 1 wherein the calcination step is conducted at temperatures ranging from about 900 to about 1050° F.

9. The process of claim 1 wherein the ammonia treated, calcined faujasite sorbent contains essentially from about 0.3 to about 0.6 wt. percent ammonia following calcination.

10. The process of claim 1 wherein the hydrocarbon feedstock contains in excess of 60 wt. percent of the alpha-monoolefin-diolefin mixtures.

11. The process of claim 6 wherein the olefinic mixture containing hydrocarbon feedstock is contacted with the ammonia treated synthetic faujasite sorbent at temperatures ranging from about 250 to 550° F.

References Cited

UNITED STATES PATENTS

| | | | |
|---|---|---|---|
| 2,988,503 | 6/1961 | Milton et al. | 260—677 |
| 3,106,593 | 10/1963 | Benesi et al. | 260—677 |

DELBERT E. GANTZ, *Primary Examiner.*

HERBERT LEVINE, *Examiner.*